(12) United States Patent
Wang et al.

(10) Patent No.: US 7,675,850 B2
(45) Date of Patent: Mar. 9, 2010

(54) APPARATUS FOR REALIZING SOFT-SWITCH ALLOPATRIC DISASTER RECOVERY BASED ON PACKET NETWORK

(75) Inventors: Chen Wang, Shenzhen (CN); Xianli Hu, Shenzhen (CN); Rujun Li, Shenzhen (CN); Haipeng Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 947 days.

(21) Appl. No.: 10/581,387

(22) PCT Filed: Dec. 5, 2003

(86) PCT No.: PCT/CN03/01041

§ 371 (c)(1),
(2), (4) Date: Jun. 2, 2006

(87) PCT Pub. No.: WO2005/055517

PCT Pub. Date: Jun. 16, 2005

(65) Prior Publication Data

US 2009/0109839 A1    Apr. 30, 2009

(51) Int. Cl.
*H04J 1/16* (2006.01)
(52) U.S. Cl. .................... 370/218; 370/228; 370/324; 370/368
(58) Field of Classification Search .......... 370/216, 370/217, 218, 219, 220, 221, 225, 227, 228, 370/312, 321, 324, 350, 363, 368, 383, 401, 370/466, 331, 338, 407; 455/445, 408
See application file for complete search history.

(56) References Cited

U.S. PATENT DOCUMENTS 6,970,448 B1 * 11/2005 Sparrell et al. ............. 370/347
7,468,984 B1 * 12/2008 Croak et al. ................ 370/401

FOREIGN PATENT DOCUMENTS

EP    0874314 A1    10/1998

OTHER PUBLICATIONS

Lu Lin et al., "Application of Data Remote Back-up in Electronic Business Security", Computer Application, vol. 22, No. 7, Jul. 2002, pp. 83-85.

(Continued)

*Primary Examiner*—Chi H Pham
*Assistant Examiner*—Alexander Boakye

(57) ABSTRACT

The present invention provides a device for realizing disaster recovery of soft-switch based on packet network, comprising at least two core control devices located in different places which provide control service for their respective access equipments; wherein said core control devices further include a process unit, a database unit, a share unit and a synchronization process unit which are specifically used for remote disaster recovery; said process unit and database unit are independent of the processor and the database already existing within the core control devices, and are specifically used for providing service for remote access equipments, thereby making the core control devices in different places be of mutual disaster recovery relation; said share unit is used for sharing processing ability and data; and said synchronization process unit is used for synchronizing data between the core control devices of mutual disaster recovery. The core control devices capable of providing disaster recovery function of the present invention guarantee uninterrupted operation for system, and provide high accessability of the access equipments in the packet switch network.

10 Claims, 2 Drawing Sheets

OTHER PUBLICATIONS

Liu Yingfeng et al., "Disaster Recovery: Concept and Application", Computer Application Research, No. 6, 2002, pp. 7-10.

"Cisco MGC Node Manager Provisioning Tool User's Guide Version 2.4(1)," Cisco Systems Inc., May 2003, pp. I-IN-1. Retrieved from the Internet on May 11, 2009.

Groves, C., Pantaleo, M., Ericsson, LM, Anderson, T. "Gateway Control Protocol Version 1," IETF Standard, Internet Engineering Task Force; Jun. 1, 2003, pp. 81-82.

European Search Report, Jun. 24, 2009.

* cited by examiner

APPARATUS FOR REALIZING SOFT-SWITCH ALLOPATRIC DISASTER RECOVERY BASED ON PACKET NETWORK

TECHNICAL FIELD OF THE INVENTION

The present invention relates to the improvement of telecommunication switch equipments under the next generation network architecture in the field of telecommunication, specifically, relates to a device for realizing disaster recovery of soft-switch based on packet network.

TECHNICAL BACKGROUND OF THE INVENTION

As for the traditional telecommunication switch equipments, the switch control was mainly hardware-based. Under such condition, the control domain of each equipment was fixed, and the controlling devices and the controlled equipments were connected by electrical cables. Therefore, it was nearly impossible for such system to realize disaster recovery with controlling devices in different places.

The next generation network employs soft-switch as core control, and employs packet switch network as transmission network instead of the fixed electrical cable connection, and making it possible to provide a control device with disaster recovery function. But the current core control devices in next generation network have not provided disaster recovery function yet.

SUMMARY OF THE INVENTION

The purpose of the present invention is to provide a device for realizing disaster recovery of soft-switch, which makes the core control devices of the next generation network possess the disaster recovery function, thus, when one of the core control devices failed, the other core control device located elsewhere will take over the equipments under the control of the failure device, and ensure the continuous control service available.

The present invention is realized by the following:

A system for realizing disaster recovery of soft-switch based on packet network, comprising at least two core control devices located in different places, each of which providing control service for their respective access equipments;

wherein said core control devices further include the following units served for disaster recovery function:

a process unit, a database unit, a share unit, a synchronization process unit;

said process unit and database unit are independent of the existing ones in the local core control devices, and are specifically used for providing service for the remote access equipments, thus make the two core control devices in different places be of mutual disaster recovery;

said share unit is used for sharing processing ability and data with local core control device; and said synchronization process unit is used for synchronizing data between the core control devices of mutual disaster recovery.

Data in the database unit serving the remote access equipments comes from the database of the remote core control device, and is achieved by the synchronization process unit within the core control devices;

Modification of configuration data in anyone of said core control devices will trigger the synchronization process unit to synchronize data to the other core control device of mutual disaster recovery; and anyone of said core control devices can also take the initiative to request for, via the synchronization process unit, the configuration data from the other core control device of mutual disaster recovery.

In said share unit, the shared processing ability is mainly the network processing ability, the shared data includes local basic environment parameters, a distribution table and distribution situation of the access equipments;

Said distribution table is used to make routing decision for requests submitted to the core control devices, deciding whether the requests should be handed over to the local processor or the process unit;

The distribution situation of said access equipments not only includes the distribution situation of the access equipments controlled masterly by local core control device, but also includes the distribution situation of the access equipments controlled by the remote core control device. If one of the access equipments registers to or unregisters from a core control device, no matter whether the local core device is the master control of the access equipment or not, the current distribution of the access equipment should be recorded, and be synchronized to the remote core control device of mutual disaster recovery via the synchronization process unit, so as to guarantee that this access equipment can be accessed by other equipments.

The data transmission between devices of mutual disaster recovery accomplished by said synchronization process unit is generally established on a TCP connection which is maintained during the whole running period of system, so as to guarantee the reliable and prompt synchronization of data via IP network.

At the beginning of establishing the mutual disaster recovery relation between two core control devices or when the data will be re-synchronized, a vast amount of configuration data has to be synchronized. The efficiency of data transmission and network utilization can be improved by first generating a data file in local core control device, then transmitting the data file to the remote one via FTP protocol, and then extracting the date from the data file in the remote.

The daily maintenance and management of said core control devices themselves are performed independently. The configuration data added, deleted and modified in one core control device should be synchronized to the other core control device of mutual disaster recovery, so that when one of the core control devices failed, disaster recovery handoff can be performed promptly.

The failure of said core control devices is detected by the access equipments for which the core control device provides service, that is, the access equipments should be able to detect whether the core control devices are available via a handshake mechanism by themselves, and be able to automatically hand over to the other preset core control device of mutual disaster recovery after detecting the failure of the core control device.

Said core control devices and access equipments which are controlled and served by said core control devices locate in a packet switch network;

said core control devices support the disaster recovery handoff of part of the access equipments, that is, while one of the core control devices of mutual disaster recovery operates normally, the other core control device can take over part or all of its access equipments.

Between the core control devices of mutual disaster recovery, the registration distribution situation of the access equipments is synchronized in real time; said core control devices decide, according to the current distribution of the access equipments, whether the access to the local access equipments should be processed locally or forwarded to the remote core control device, or whether the access to remote access equipments is forwarded to the remote core control device or processed locally.

After the broken-down core control device restores operation, the handoff of the local access equipments registering on the remote core control device back to local will be implemented by the remote one according to a preset disaster restore strategy.

In the next generation network system architecture, the control function of the core control devices becomes more concentrated, raising higher requirements on equipment stabilization and reliability, though faults from outside can not be avoided in any way. Under such condition, the core control devices capable of providing disaster recovery function can guarantee uninterruptable running for system. Meanwhile, the core control devices of the present invention support disaster recovery handoff of part of the access equipments, thereby providing high accessability of the access equipments in the packet switch network.

BRIEF DESCRIPTION OF APPENDED DRAWINGS

DETAILED DESCRIPTION OF PREFERRED EMBODIMENT

Figure 1:
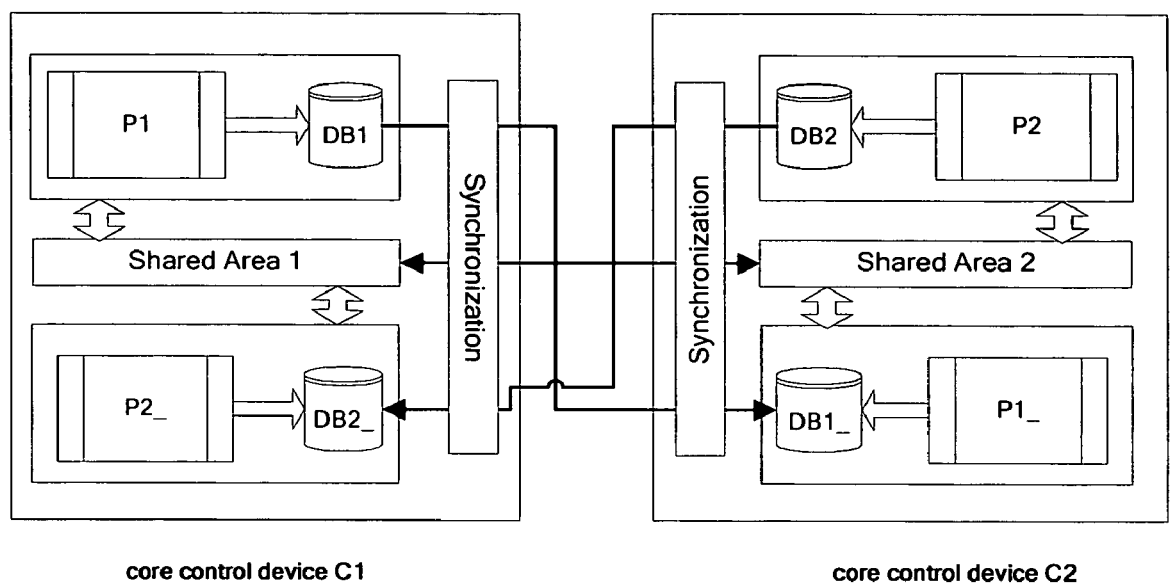
FIG. 1 is schematic view of structure of the next generation network core control device providing disaster recovery.

Next, the embodiment of technical scheme will be further described in detail below in combination with the appended drawings:

In the next generation network architecture employing soft-switch as the core control device of the present invention, there are two or more core control devices located in different places. In normal situation, all of these control devices are in service, which manage their respective access equipments and provide control service. When one of the core control devices can not provide service due to some disastrous faults, the remote core control device of mutual disaster recovery can take over the failure control device within shortest time, and continue to provide qualified service, as long as the access equipments under its control do not go wrong at this moment, the operation will not be influenced.

In the control devices of the present invention, in order to provide the disaster recovery function, independent processor and database space are specified for serving the control devices of mutual disaster recovery, thereby decreasing the influence on the service of the local system to the largest extent in the situation of disaster recovery. The daily maintenance and management of the core control devices themselves are performed independently, but the added, deleted and modified configuration data in one core control device are synchronized to the other core control device of mutual disaster recovery, so that when one of the control devices failed, the disaster recovery handoff can be performed immediately, and the other core control device will take over the brokendown device.

Further, in the system of the present invention, it is the access equipment rather than the other core control device that detects the faults occurred in one core control device. That is, the access equipments should be able to take the initiative to detect whether the control devices are available via a hand-shake mechanism, and be able to hand themselves over to the preset backup control device automatically after detecting the fault of the core control device.

Further, the core control devices of the present invention and the access equipments under the control of the control devices are located in the packet switch network, and whether the control devices are available or not is detected by the access equipments, therefore, when one of the access equipments considers that its master control device is unavailable due to certain reasons (for example, the network can not be accessed), the access equipments will hand over to the preset backup control device although its master control device still operates normally at this moment. The control devices of the present invention support handoff of part of the access equipments, that is, in the case that when one control device of mutual disaster recovery operates normally, the other control device can take over part or all of the access equipments of it.

Furthermore, because the control devices of the present invention support handoff of part of the access equipments, the registration distribution situation of the access equipments is synchronized in real time between the control devices of mutual disaster recovery. The control devices decide, according to the current distribution of the access equipments, whether the access to the local access equipments is implemented locally or forwarded to the remote core control device, or whether the access to the remote access equipments is forwarded to the remote core control device or implemented locally.

Furthermore, in the disaster recovery architecture of the present invention, after the broken-down control device restores operation, the handoff of the access equipments registering on the backup control device back to the master control device is implemented by the backup control device according to the preset disaster restore strategy.

FIG. 1 is the schematic view for the core control devices of the present invention realizing the disaster recovery function. The core control devices C1 and C2 are of mutual disaster recovery. The "→" in the drawing represents the data synchronization between core control devices of mutual disaster recovery, "⇨"represents the access to the database by processor, "⇌"represents data exchanges between the processor and the shared area. In order to provide the disaster recovery function, an independent processor unit and an independent database unit are specified for serving the core control device of mutual disaster recovery, thereby decreasing the influence on the service of the local system to the largest extent in the situation of the disaster recovery. In which, P (processor) and DB (database) provide service for the access equipments with local core device as master control, while P_(processor unit) and DB_(database unit) provide service for the access equipments with the remote core device as master control, and they are independent with each other (for example, in control device C1, P1 and DB1 serve C1, P2_and DB2_serve C2). The Shared Area in the device is the shared part, including the share of processing ability and data. Synchronization (synchronization process) is for performing the data synchronization between control devices of mutual disaster recovery.

The data in the database unit DB_serving the remote access equipments comes from database DB of the remote control device, that is, the data in DB2_ of C1 comes from DB2 of C2, vice versa. This is accomplished through the synchronization process in devices C1 and C2. When configuration data is modified in anyone of the control devices, the synchronization process will be triggered to synchronize the data to the other control device of mutual disaster recovery. Anyone of the control devices can also take the initiative to request for, through the synchronization process, the related configuration data from the other control device of mutual disaster recovery.

In Shared Area, the shared processing ability is mainly the network processing ability, the shared data includes the local basic circumstance parameters, a distribution table and the distribution situation of the access equipments, etc. The function of the distribution table is to make routing decision for the requests submitted to the devices, that is, decide whether the requests should be handed over to P or P_. The distribution situation of the access equipments includes the distribution situation of not only the local access equipments, but also the remote access equipments. When one of the access equipments registers to or unregisters from the local control device, no matter whether the access equipment is with the local core device as master control or not, its current distribution should be recorded, and be synchronized in real time to the remote control device of mutual disaster recovery via the synchronization process, thereby guaranteeing that this access equipment can be accessed by other equipments. It is just because of having the distribution data, the control devices of the present invention are able to support the disaster recovery handoff of part of the access equipments.

Synchronization is for implementing data synchronization between control devices of mutual disaster recovery. In order to guarantee the reliable and prompt synchronization of data via IP network, the data synchronization transmission between devices of mutual disaster recovery is generally established on a TCP connection which is maintained during the whole running period of the system. As for the synchronization of a vast amount of configuration data (such as at the beginning of establishing the disaster recovery relation, or when the data to be re-synchronized), the efficiency of data transmission and network utilization can be greatly improved by first generating a data file in the local core control device, then transmitting the data file to the remote one through FTP protocol, and still then extracting the date from the data file in the remote.

Figure 2:
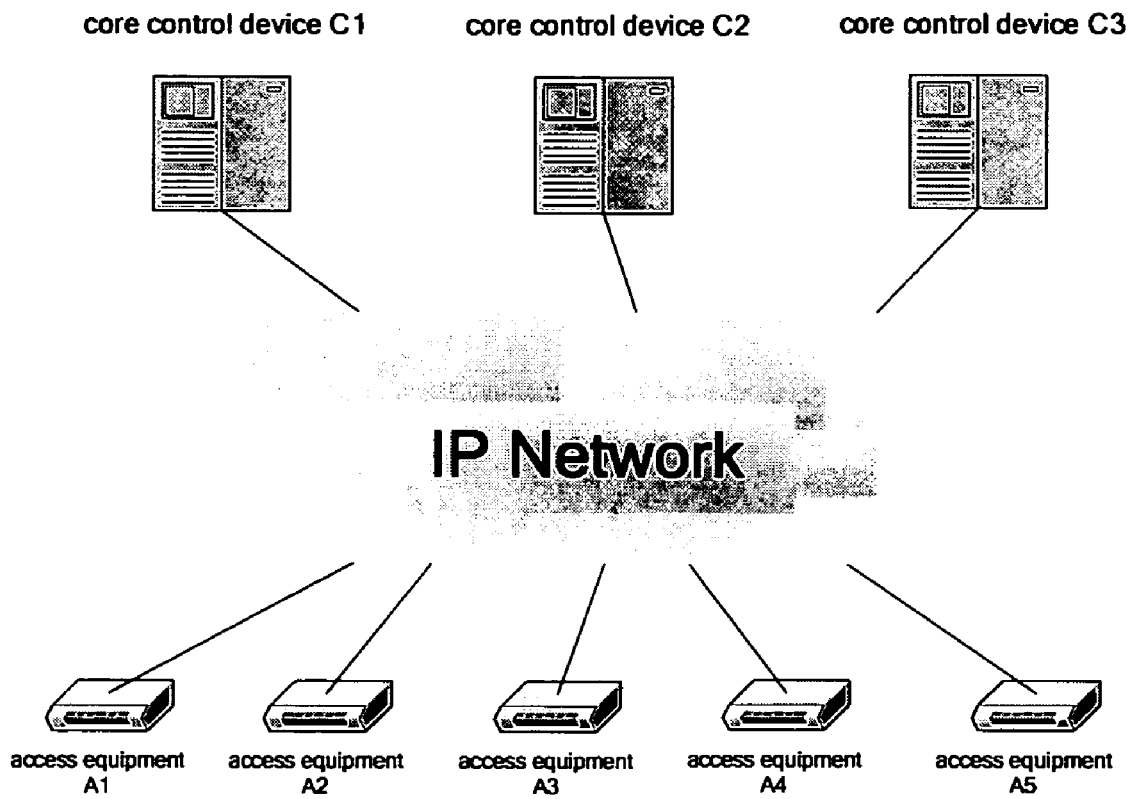
FIG. 2 is schematic view of framework of the next generation network core control device providing disaster recovery.

Next, with FIG. 1 and FIG. 2, the embodiment scheme of the disaster recovery will be further described in detail from three aspects, the disaster recovery of the core control device, disaster recovery handoff of part of the access equipments and disaster restore strategy. The schematic view of networking shown in FIG. 2 is a typical architecture of the next generation network, in which, C1, C2, C3 are the core control devices providing disaster recovery function in next generation network, located in the control layer of the network architecture, wherein, C1 and C2 are of mutual disaster recovery. The access equipments A1, A2, A3, A4 and A5 are the access equipments under the control of the core control devices located in the access layer of the network architecture, in which, the master control device of A1, A2 is C1, the master control device of A3, A4 is C2, and the master control device of A5 is C3.

1. The Disaster Recovery of the Core Control Device

When the control device C1 or C2 failed, for example, when C1 failed, the other control device C2 will take over the access equipments A1 and A2 under the control of C1, that is, the disaster recovery of the core control devices happens. This process is initiated by the access equipments A1 and A2 rather than the control device C2. That is, after the access equipments A1 and A2 under the control of C1 take the initiative to detect that the master control device C1 is unavailable, they will turn to the backup control device C2 for registration, and become the current access equipments under the control of C2.

At this time, the mutual access between equipments A1 and A2 are similar to that when they are under the control of C1.

At this time, when the access equipments of C2 itself, such as A3, wants to access to A1, C2 gets the information that A1 has registered locally by inquiring the distribution data of the access equipments in the Shared Area, and routes the original remote access request for C1 to local.

As for the access request from access equipment A5 of the third party control device (for example C3) to A1, in normal situation, the control device C3 sends this access request to the master control device C1 of A1, and then C1 send this access request to A1. In the condition that C1 failed, and the access equipments of C1 are taken over by C2 (disaster recovery), if access from A5 to A1 is desired, it is necessary to configure two replaceable routes in C3, route to the two core control devices of disaster recovery respectively. Thus, when C1 failed and can not be accessed, C3 will automatically send the access request to C2 through the replaceable route, since A1 has registered on C2 at this time, the access request will be accepted.

2. The Disaster Recovery Handoff of Part of the Access Equipments

The control devices of the present invention support the handoff of part of the access equipments. Take access equipment A1 for example, when A1 can not register on its master control device C1 or when C1 is detected to be unavailable via the protocol hand-shake mechanism (for reasons such as the network can not be accessed), even if the master control equipment C1 is in normal operation state at this moment, A1 will still turn to register to the backup control device C2 which is of mutual disaster recovery with C1, and the control device C2 will accept A1 as the one of its current access equipments.

At this time, when A1 wants to access the access equipment A2 which is still under the control of C1 currently, C2 inquires the distribution data of the access equipments in the Shared Area, and routes the original local access request to the remote core control device (C1). By the same token, the access from A2 to A1, the original local access request is routed to the remote core control device (C2) by C1 according to the distribution data of the access equipments of C1.

At this time, when the access equipments of C2 itself, such as A3, wants to access A1, C2 gets the information that A1 has registered locally by inquiring the distribution data of the access equipments of C2, and routes the original remote access request to the local.

As for the access from the access equipment A5 of the third party control device (such as C3) to A1, because C1 is still in normal operation state at this moment, C3 will send the access request to the master control device C1 of A1 as normal. After receiving the request, C1 gets the information that A1 has registered on C2 by inquiring the distribution data of the access equipments in the Shared Area, and then routes the access request to C2.

3. Disaster Restore Strategy

When the situation of disaster recovery occurs, the access equipments register to the backup control device, for example, A1 registers to C2, the access equipments will not take the initiative to detect whether the master control device is available or not until they detect that the current control device (C2) is unavailable. That is, no matter whether C1 is restored or not at this time, or whether the network circumstance of A1 is improved or not, A1 will not take the initiative to register back to C1. The action for A1 to register back to the master control device C1 can only be implemented by the current control device C2, or be triggered when the current control device C2 becomes unavailable.

There is a disaster restore strategy configured for the core control device, which prescribes the time when the access equipments are required to register back to the master control equipment by signaling command and the actions taken thereof. At this time, if the connection between the control devices of mutual disaster recovery is in active state, that is, from the view of the core control device, the other party is considered to be in normal operation state, According to the strategy, P_transmits the signaling command to the remote equipments currently registered by inquiring the Shared Area. To avoid the simultaneous registration of a vast amount of the access equipments, the signaling commands for registration back to the master control device can be transmitted to the access equipments group by group according to the strategy. An artificially interfered disaster restore strategy can also be employed.

The core control devices of the present invention employ the technical scheme that the local service and the remote disaster recovery service coexist while being independent with each other. The core control devices of mutual disaster recovery are all in operation state in normal situations, therefore, when one of the control devices failed, the time for accomplishing the disaster recovery handoff is actually the time for the access equipments to re-registering, thereby guaranteeing that the service can be restored in a short time. Because the decision-making on whether a disaster occurs is performed by the access equipments rather than the control devices through mutual monitoring and judging, the misleading or wrong decisions due to such factors as instability of network can be avoided, and the result thereof that a vast amount of access equipments registration or unregistration can be avoided. Meanwhile, because the control devices of the present invention permits the disaster recovery handoff of part of the access equipments, when some access equipments can not access to the master control device due to some faults occurred in the network circumstance etc, the access equipments can choose to register to the backup control device, thus greatly improving the availability of the access equipments.

What we claim is:

1. A device for realizing disaster recovery of soft-switch based on a packet network,
   comprising at least two core control devices located in different places which provide control service for their respective access equipments;
   wherein each of said core control devices further includes the following units used for disaster recovery:
   a process unit, a database unit, a share unit, a synchronization process unit;
   said process unit and database unit are independent of a processor and a database already existing within each of the core control devices, and are specifically for serving remote access equipments, thereby making the core control devices in different places be of mutual disaster recovery relation;
   said share unit is used for sharing processing ability and data; and
   said synchronization process unit is used for synchronizing data between the core control devices of mutual disaster recovery.

2. The device for realizing disaster recovery of soft-switch based on a packet network of claim 1, wherein
   data in the database unit serving remote access equipments comes from the database in the remote one of the core control devices, and is realized by the synchronization process unit within the core control devices of mutual disaster recovery;
   Modification of configure data in anyone of said core control devices will trigger the synchronization process unit to synchronize data to the other core control device of mutual disaster recovery; and
   anyone of said core control devices can also take initiative to request for, via the synchronization process unit, related configuration data from the other core control device of mutual disaster recovery.

3. The device for realizing disaster recovery of soft-switch based on a packet network of claim 1, wherein
   in said share unit, the processing ability shared is mainly network processing ability, the data shared includes local basic environment parameters, a distribution table and distribution situation of the access equipments;
   said distribution table is used to make routing decision for requests submitted to the core control devices, deciding whether the requests should be handed over to the existing processor or the process unit;
   the current distribution situation of said access equipments not only includes distribution situation of the access equipments with local core device as master control, but also includes the distribution situation of the access equipments with remote core device as master control. If one of the access equipments registers to or unregisters from the local core control device, no matter whether it is the access equipment with the local core device as master control or not, its current distribution should be recorded, and be synchronized to the remote core control device of mutual disaster recovery via the synchronization process unit, so as to guarantee that this access equipment can be accessed by other equipments.

4. The device for realizing disaster recovery of soft-switch based on a packet network of claim 1, wherein
   data transmission between devices of mutual disaster recovery implemented by said synchronization process unit is generally established on a TCP connection which is maintained during the whole running period of system, so as to guarantee the reliable and prompt synchronization of data via IP network.

5. The device for realizing disaster recovery of soft-switch based on a packet network of claim 4, wherein
   at the beginning of establishing the mutual disaster recovery relation or when the data will be re-synchronized, a vast amount of configuration data will be synchronized. Efficiency of data transmission and network utilization can be improved by first generating a data file in the local core control device, then transmitting the data file to the remote one via FTP protocol, and then extracting the date from the data file in the remote.

6. The device for realizing disaster recovery of soft-switch based on a packet network of claim 1, wherein
   daily maintenance and management of said core control devices themselves are performed independently. Added, deleted and modified configuration data in one core control device should be synchronized to the other core control device of mutual disaster recovery, so that when there is failure occurring in one of the core control devices, disaster recovery handoff can be performed promptly.

7. The device for realizing disaster recovery of soft-switch based on a packet network of claim 1, wherein
   failure occurring in said core control devices is detected by the access equipments for which the core control devices provide service, that is, the access equipments should be able to take the initiative to detect whether the core control devices are available through a protocol handshake mechanism, and be able to automatically hand over to the preset backup core control device of mutual disaster recovery after detecting the unavailability of the core control device.

8. The device for realizing disaster recovery of soft-switch based on packet network of claim 1, wherein said core control devices and access equipments which are controlled and served by said core control devices locate in a packet switch network;

said core control device supports the disaster recovery handoff of part of the access equipments, that is, in the case that one of the core control devices of mutual disaster recovery operates normally, the other core control device can take over part or all of its access equipments.

9. The device for realizing disaster recovery of soft-switch based on a packet network of claim 1, wherein between the core control devices of mutual disaster recovery, registration distribution situation of the access equipments is synchronized in real time; said core control devices decide, according to the distribution of the access equipments, whether access request to the local access equipments should be performed locally or forwarded to the remote core control device, or whether access to remote access equipments should be forwarded to the remote or performed locally.

10. The device for realizing disaster recovery of soft-switch based on a packet network of claim 1, wherein after a broken-down core control device restores operation, handoff of the local access equipments registering on the remote core control devices back to local is implemented by the remote one of mutual disaster recovery according to a preset disaster restore strategy.

* * * * *